(12) United States Patent
Tamagawa

(10) Patent No.: US 6,943,917 B2
(45) Date of Patent: Sep. 13, 2005

(54) COLOR REPRODUCTION CHARACTERISTIC CORRECTION METHOD

(75) Inventor: Kiyomi Tamagawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 729 days.

(21) Appl. No.: 09/984,860

(22) Filed: Oct. 31, 2001

(65) Prior Publication Data

US 2002/0051159 A1 May 2, 2002

(30) Foreign Application Priority Data

Oct. 31, 2000 (JP) ........................................ 2000-333158

(51) Int. Cl.⁷ .............................. B41J 1/00; H04N 1/46
(52) U.S. Cl. ........................ 358/1.9; 358/504; 358/523
(58) Field of Search .......................... 358/1.9, 504, 523

(56) References Cited

U.S. PATENT DOCUMENTS 5,317,425 A * 5/1994 Spence et al. .............. 358/504

FOREIGN PATENT DOCUMENTS

| JP | 9-172551 A | 6/1997 | |
|---|---|---|---|
| JP | 11-177834 A | 7/1999 | |
| JP | 2000-278547 A | 10/2000 | |
| JP | 2000-278547 | 10/2000 | ............ H04N/1/60 |
| JP | 2001-45313 A | 2/2001 | |

* cited by examiner

Primary Examiner—Kimberly Williams
Assistant Examiner—Charlotte M. Baker
(74) Attorney, Agent, or Firm—Sughrue Mion, PLLC (57) ABSTRACT

A color reproduction characteristic is readily corrected with great accuracy. A color chart, of which dot % is different from that of a color chart involved in creation of a printing profile, and which is not many in the number of color patches, is outputted by both printing machine and proofer. Color measurement values of the color charts thus obtained are compared with one another to correct the printing profile.

5 Claims, 6 Drawing Sheets

COLOR REPRODUCTION CHARACTERISTIC CORRECTION METHOD

BACKGROUND OF THE INVENTION

1. Field of the Invention

The present invention relates to a color reproduction characteristic correction method of correcting a color reproduction characteristic of a proof image wherein a color conversion definition, which consists of a combination of a profile of a target device for outputting an image based on image data and a profile of a proofer for outputting an image based on image data, is used to convert image data for the target device into image data for the proofer so that the proof image based on image data after conversion is outputted.

2. Description of the Related Art

Hitherto, when a printing machine is used to perform a color image printing, it is performed that prior to the printing, a color printer and the like is used to create a proof image which is intended to be similar in color to an image to be printed by the printing machine. When the printer is used to create the proof image, detected are a color reproduction characteristic (a printing profile) describing a relationship between image data and a color of the actual printed matter, associated with a printing machine of interest, and a color reproduction characteristic (a printer profile) describing a relationship between image data and a color of an image to be actually printed, associated with a printer. A color conversion definition, which consists of a combination of the printing profile and the printer profile, is created, and image data for printing is converted into image data for printers in accordance with the color conversion definition, so that a proof image is created in accordance with the image data for printers thus converted. Thus, it is possible to create a proof image that is coincident with the actual printed matter in color.

In order to obtain a proof image that is coincident with the actual printed matter in color in the manner as mentioned above, there is a need to determine with great accuracy color reproduction characteristics (profiles) of the output device such as a printing machine and a printer. When the color reproduction characteristics (profile) is determined, image data, which corresponds to a color chart wherein color patches are arranged, is created, the output device outputs the color chart in accordance with the image data thus created, the color chart is measured by the spectrocolorimeter, and the coordinates of the color space (the device color space) on the image data are associated with the coordinates of the colorimetry color space. Thus, it is possible to determine the profile of the output device.

However, even if color reproduction characteristics (profiles) of the output device such as a printing machine and a printer are carefully determined in the manner as mentioned above, and image data is converted in accordance with the color conversion definition consisting of a combination of the color reproduction characteristics (profiles), various errors and variation factors cause such a phenomenon that colors are slightly different from one another between a printed matter and a proof image.

In such a situation, in some case, it is unclear where and how those profiles or the color conversion definition are corrected, and even if it is clear where and how those profiles or the color conversion definition are corrected, it would be a hard job that those are corrected one by one.

Japanese Patent Application Laid Open Gazette Toku-Kai 2000-278547 (U.S. patent application Ser. No. 09/646,600) exemplary discloses the solution of the foregoing problem. A method disclosed in the Toku-Kai 2000-278547 relates to a method in which the same image data as that in accordance with which a chart image is created when a profile of a printing machine is created, is subjected to a color conversion in accordance with a profile of the printing machine and a profile of a proofer, the proofer outputs a chart image in accordance with the image data after the color conversion, the chart image outputted from the proofer is color-measured and the profile is created, a color difference for each lattice point between the thus created profile and the profile of the printing machine is determined, and the color difference thus determined is reflected on the profile of the printing machine.

In case of this method, with respect to the vicinity of colors (measured points on a color space) measured through outputting in form of the chart image, it is possible to detect and correct a color difference even if errors, which are not reflected on the profile of the proofer, such as difference in machine type of the proofer, are included. However, on the other hand, with respect to the portion determined in accordance with the interpolation computation, other than the measured points, even if errors are included in the interpolation computation, it is recognized that a result of the computation is a proper chromaticity value, so that it may be reflected on a modified result. Thus, according to the above-mentioned scheme, it is difficult to correct errors owing to the interpolation computation.

SUMMARY OF THE INVENTION

In view of the foregoing, it is an object of the present invention to provide a color reproduction characteristic correction method capable of readily and accurately correcting a color reproduction characteristic of a proof image wherein image data representative of an image outputted from a target device such as a printing machine is converted into image data for a proofer so that the proof image based on the image data after conversion is outputted by the proofer such as a printer.

To achieve the above-mentioned object, the present invention provides a color reproduction characteristic correction method of correcting a color reproduction characteristic of a proof image wherein a color conversion definition, which consists of a combination of a target profile of a target device for outputting an image based on target image data defined by coordinate values on a predetermined target device color space, said target profile being representative of an association between the coordinate values on the target device color space and coordinate values on a colorimetric color space of a device-independence, and a proofer profile of a proofer for outputting an image based on proof image data defined by coordinate values on a predetermined proofer color space, said proofer profile being representative of an association between coordinate values on the proofer color space and coordinate values on the colorimetric color space of the device-independence, is used to convert the target image data defined by the coordinate values on the target device color space into the proof image data defined by the coordinate values on the proofer color space so that the proof image based on the proof image data is outputted using said proofer, wherein said target profile is created via a first chart output step in which said target device is used to output a color chart in accordance with first chart data representative of a color chart in which a plurality of color patches are arranged, said first chart data being defined by the coordinate values on the target device color space, and a first color measurement step of measuring the plurality of color patches constituting the color chart obtained in said first chart output step to obtain first color measurement data defined by the colorimetric color space, and wherein said color reproduction characteristic correction method comprises:

a second chart output step in which said target device is used to output a color chart in accordance with second chart data representative of a color chart in which a plurality of color patches is arranged, at least part of the plurality of color patches including a color patch defined by coordinate values different from coordinate values for the plurality of color patches constituting the color chart represented by the first chart data on said target device color space;

a second chart color measurement step for measuring a plurality of color patches constituting the color chart obtained in said second chart output step to obtain second color measurement data defined by the colorimetric color space;

a third chart output step in which said color conversion definition is used to convert said second chart data defined by the coordinate values on said target device color space into third chart data defined by the coordinate values on said proofer color space, and said proofer is used to output a color chart in accordance with the third chart data;

a third chart color measurement step for measuring a plurality of color patches constituting the color chart obtained in said third chart output step to obtain third color measurement data defined by the colorimetric color space; and a definition correction step of correcting said color conversion definition in accordance with the second color measurement data in said second chart color measurement step and the third color measurement data in said third chart color measurement step.

According to the color reproduction characteristic correction method of the present invention, the second chart data representative of a color chart including color patches defined by coordinate values different from coordinate values of a plurality of color patches constituting a color chart represented by the first chart data used in output of the color chart involved in the first creation of the target profile and the third chart data subjected to the color conversion for the proofer are used to output color charts. Thus, according to the present invention, the correction is performed using colors that are not included in the color chart when the target profile is first created, so that a color conversion definition is created using a larger number of points on the color space together with the first color chart, and thereby performing the correction with great accuracy. Further, according to the present invention, it is possible to readily correct the color reproduction characteristic as compared with direct operation of the color conversion definition once created.

That is, in comparison of the method of the present invention with the scheme of the above-mentioned Japanese Patent Application Laid Open Gazette Toku-Kai 2000-278547 (U.S. patent application Ser. No. 09/646,600), according to the scheme of this Gazette, as mentioned above, only the color chart, which is involved in the first creation of the target profile, is used to apply a modification to the target profile. On the other hand, according to the method of the present invention, the color chart, which includes colors that are not included in the color chart involved in the first creation of the target profile, is used to apply a modification to the target profile. Thus, according to the method of the present invention, it is possible to apply a modification also with respect to the portion determined through the interpolation computation, which is not modified in accordance with the conventional method, in accordance with the color difference obtained through the measurement. Accordingly, it is possible to implement the correction with greater accuracy as compared with conventional method.

In the color reproduction characteristic correction method according to the present invention as mentioned above, it is preferable that said second chart output step and said third chart output step output the color charts in accordance with the second chart data and the third chart data each representative of a color chart in which color patches, number of which is less than that of the color patches constituting the color chart represented by the first chart data, are arranged, respectively.

To perform the correction, there is no need to prepare so a large number of color patches when a profile is first created. It is sufficient to prepare the number of color patches, which is less than the number of color patches when a profile is first created. Reduction of the number of color patches makes it possible to effectively perform the correction in short time.

Further, in the color reproduction characteristic correction method according to the present invention as mentioned above, it is preferable that said second chart output step outputs the color chart in accordance with the second chart data which is converted into the third chart data representative of a color chart wherein when the second chart data is converted into the third chart data, all a plurality of color patches constituting the color charts represented by the third chart data is composed of color patches in a color reproduction area reproduced by said proofer.

In the event that the third chart data includes data out of color reproduction characteristic of the proofer, if the correction is forcibly performed, it would bring about a distortion rather than an adequate correction. To the contrary, in the event that the third chart data is involved in the inside of the color reproduction characteristic of the proofer, there is no such a possibility, and a proper correction will be performed.

Furthermore, in the color reproduction characteristic correction method according to the present invention as mentioned above, it is acceptable that said definition correction step is a step in which difference color measurement data representative of a difference between the second color measurement data and the third color measurement data is determined, and said color conversion definition is corrected in accordance with the difference color measurement data.

It is an object of the correction to remove a difference between the second color measurement data and the third color measurement data. In the event that the above-mentioned difference color measurement data is determined and the color conversion definition is performed in accordance with the determined difference color measurement data, it is possible to perform an accurate correction.

Still furthermore, in the color reproduction characteristic correction method according to the present invention as mentioned above, it is preferable that said definition correction step is a step in which of the target profile and the proofer profile constituting the color conversion definition, the target profile is corrected.

In the event that the second color measurement data is not coincident with the third color measurement data, it is unclear whether the cause resides in the target profile or the proof profile. In the event that the proofer profile is corrected, if the proofer is used to output a proof image of another target device, it would bring about a color shift or a color drift. To the contrary, correction of the target profile makes it possible to use the proofer on a common basis in form of a proofer of a plurality of target devices.

DETAILED DESCRIPTION OF PREFERRED EMBODIMENTS

Embodiments of the present invention will be described with reference to the accompanying drawings.

Figure 1:
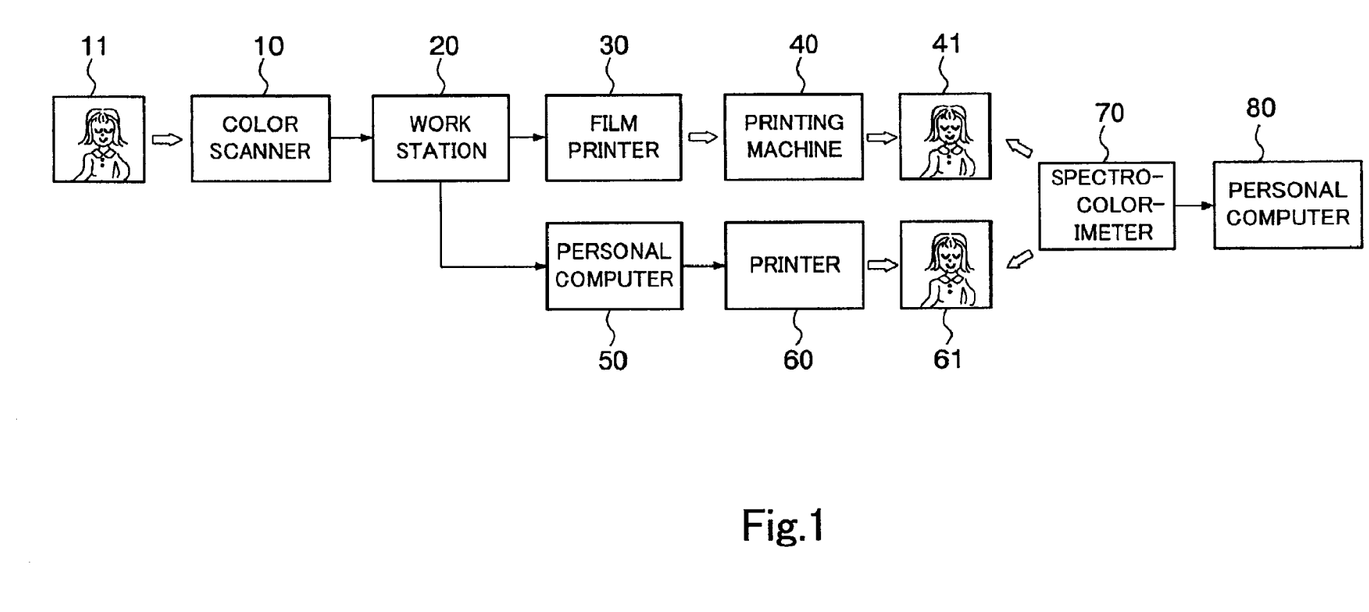
FIG. 1 is a schematic constitution view of a print and proof image creating system to which an embodiment of the present invention is applied.

FIG. 1 is a schematic constitution view of a print and proof image creating system to which an embodiment of the present invention is applied.

A color scanner 10 reads an original image 11 and produces color separation image data of four colors of CMYK representative of the original image 11. The image data of four colors of CMYK is fed to a workstation 20. The workstation 20 performs an electronic page make-up in accordance with image data entered by an operator to create image data representative of an image for printing. The image data for printing is fed, in case of performing printing, to a film printer 30 so that print film original plates for CMYK plates are produced in accordance with the fed image data.

A machine plate is produced from the print film original plate and is mounted on a printing machine 40. Ink is applied to the machine plate mounted on the printing machine 40 and is transferred onto a sheet for print to form a printed image 41 on the sheet.

A series of work, in which the film printer 30 is used to produce the film original plate and further the machine plate, the produced machine plate is mounted on the printing machine 40, and ink is applied to the machine plate to perform a printing on a sheet, is large-scale works and takes a lot of cost. For this reason, before the actual printing works, a printer 60 is used to produce a proof image 61 in accordance with a manner as set forth below, so that a finish of the printed image 41 is confirmed beforehand.

When the proof image is produced, image data, which is created by the electronic page make-up on the workstation 20, is fed to a personal computer 50. Here, the image data fed to the personal computer 50 is description language data described in a so-called PDL (Page Description Language). The personal computer 50 converts the image data of the description language into image data of four colors of CMYK developed to a bit map by a so-called RIP (Raster Image Processor). The image data of four colors of CMYK is substantially the same as the image data for printing fed to the film printer 30.

The image data for printing of four colors of CMYK is converted into image data of four colors of CMYK suitable for a printer 60 through referring to a color conversion definition having a format of LUT (Look Up Table) inside the personal computer 50. The printer 60 receives the image data for the printer of four colors of CMYK and produces the proof image 61 in accordance with the image data for the printer of four colors of CMYK.

A degree of coincidence of colors between the image 41 obtained through printing by the printing machine 40 and the proof image obtained by the printer 60 is determined by the color conversion definition inside the personal computer 50.

While FIG. 1 shows only one printing machine, it is acceptable that a plurality of printing machines exist, or alternatively it is acceptable that even if only one printing machine is adopted, a plurality of printing conditions exist. A color conversion definition is created in accordance with a plurality of printing conditions including difference in type of printing machines. A spectrocolorimeter 70 and a personal computer 80, which are shown in FIG. 1, are related to a creation of the color conversion definition.

In this manner, the proof image is produced and confirmed, so that the finish of printing is confirmed beforehand.

An aspect as an embodiment of the present invention in the proof image producing system shown in FIG. 1 resides in processing contents to be executed inside the personal computer 80. Hereinafter, there will be described the personal computer 80.

Figure 2:
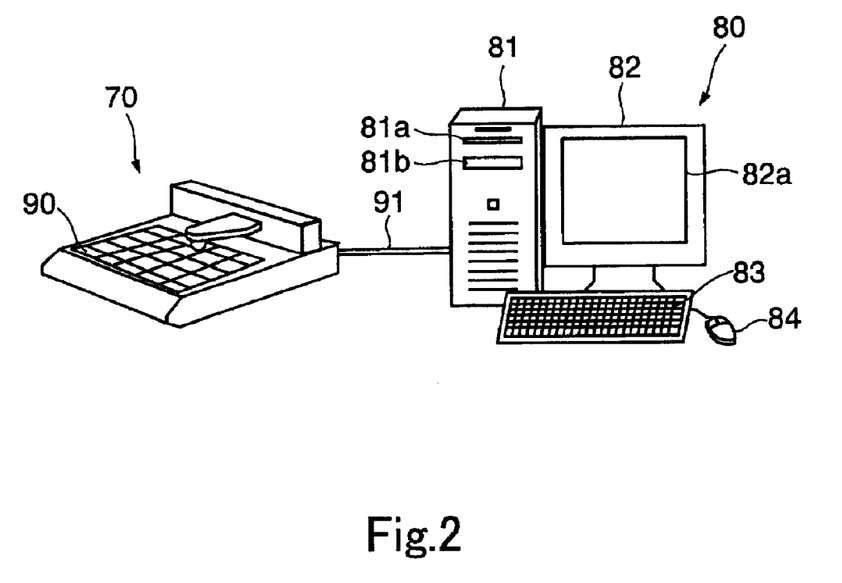
FIG. 2 is a perspective view of a spectrocolorimeter and a personal computer, which are shown in FIG. 1 with blocks.
Figure 3:
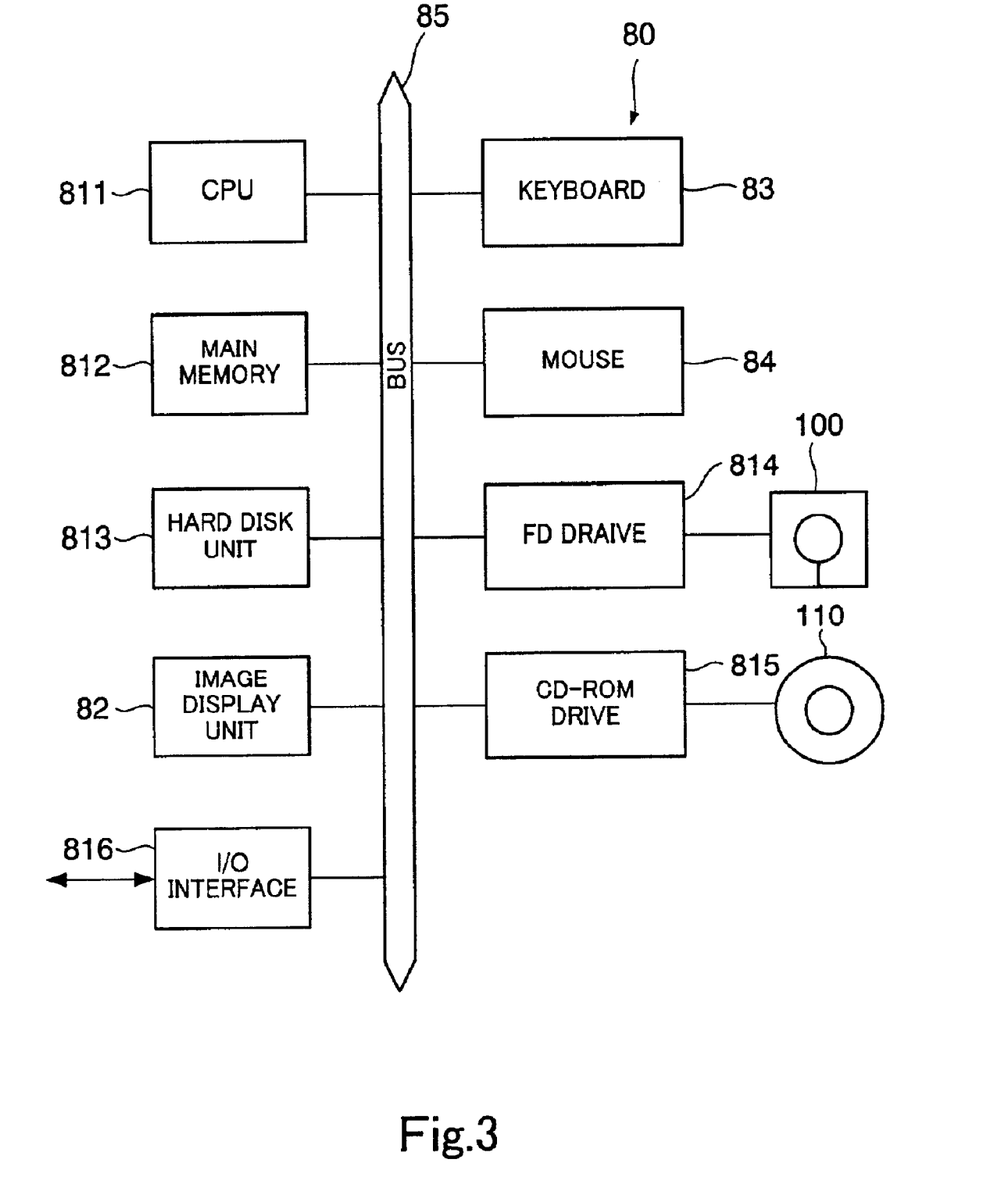
FIG. 3 is a hardware structural view of the personal computer.
Figure 4:
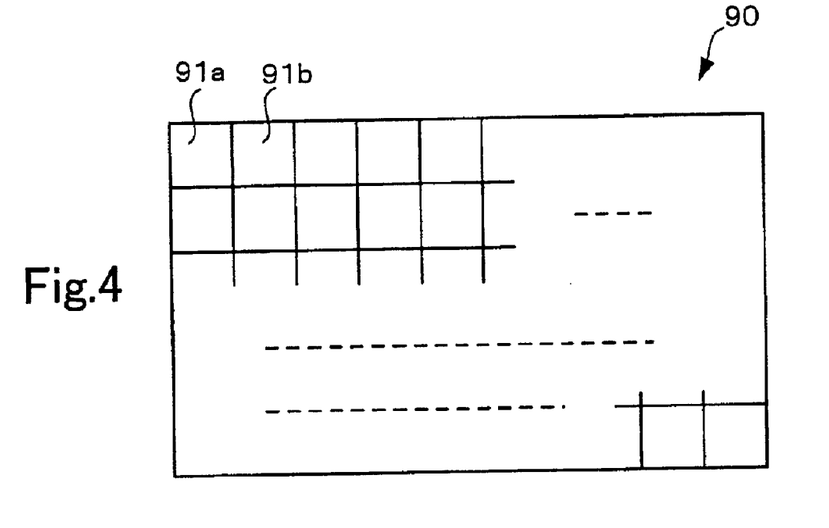
FIG. 4 is a typical illustration of a color chart.

FIG. 2 is a perspective view of a spectrocolorimeter 70 and a personal computer 80, which are shown in FIG. 1 with blocks. FIG. 3 is a hardware structural view of the personal computer 80. FIG. 4 is a typical illustration of a color chart.

A color chart 90, in which a plurality of color patches is arranged, as shown in FIG. 4, is put on the spectrocolorimeter 70 to measure colorimetric values (here XYZ values) for each of the plurality of color patches 91a, 91b, . . . constituting the color chart 90. Colorimetric data representative of the colorimetric values for each of the color patches obtained through measurement by the spectrocolorimeter 70 is fed via a cable 91 to the personal computer 80.

The color chart 90 is produced through printing by the printing machine 40 shown in FIG. 1 or through printing out by the printer 60. The personal computer 80 knows color data (coordinates on the device color space; values of CMYK) associated with the color patches constituting the color chart 90, and produces a printing profile and a printer profile in accordance with color data for the color patches of the color chart 90 and the colorimetric data obtained by the spectrocolorimeter 70. In this respect, the detail description will be described later. Next, there will be described the hardware structure of the personal computer 80.

The personal computer 80 comprises, on an external appearance, a main frame unit 81, an image display unit 82 for displaying an image on a display screen 82a in accordance with an instruction from the main frame unit 81, a keyboard 83 for inputting various sorts of information to the main frame unit 81 in accordance with a key operation, and a mouse 84 for inputting an instruction according to, for example, an icon and the like, through designation of an optional position on the display screen 82a, the icon and the like being displayed on the position on the display screen 82a. The main frame unit 81 has a floppy disk mounting slot 81a for mounting a floppy disk, and a CD-ROM mounting slot 81b for mounting a CD-ROM.

The main frame unit 81 comprises, as shown in FIG. 3, a CPU 811 for executing various types of programs, a main memory 812 in which a program stored in a hard disk unit 813 is read out and developed for execution by the CPU 811, the hard disk unit 813 for saving various types of programs and data, an FD drive 814 for accessing a floppy disk 100 mounted thereon, a CD-ROM drive 815 for accessing a CD-ROM 110 mounted thereon, an I/O interface 816 connected to the spectrocolorimeter 70 (cf. FIG. 1 and FIG. 2), to receive colorimetry data from the spectrocolorimeter 70, and a printer interface 817 to transmit image data to the printer 60. These various types of elements are connected via a bus 85 to the image display unit 82, the keyboard 83 and the mouse 84.

The CD-ROM 110 stores therein a profile creating program for causing the personal computer 80 to create a profile. The CD-ROM 110 is mounted on the CD-ROM drive 815 so that the profile creating program, which is stored in the CD-ROM 110, is up-loaded on the personal computer 80 and is stored in the hard disk unit 813.

Next, there will be described a method of creating a profile in the personal computer 80.

Here, first, a method of creating a printing profile will be explained.

Dot % data for four colors of CMYK from the workstation 20 shown in FIG. 1 are sequentially changed as 0%, 10%, . . . , 100%, so that a color chart 90 (cf. FIG. 4) based on the dot % data thus generated is created in accordance with the above-mentioned printing procedure. While the image 41 shown in FIG. 1 is not an image representative of a color chart, the spectrocolorimeter 70 is used to measure color patches 91a, 91b . . . constituting a color chart, it is assumed that the same color chart as the color chart 90 shown in FIG. 2 is printed instead of the image 41. Thus, it is possible to construct a printing profile representative of the association between coordinate values on the color space for four colors of CMYK and coordinate values on the colorimetric color space.

Figure 5:
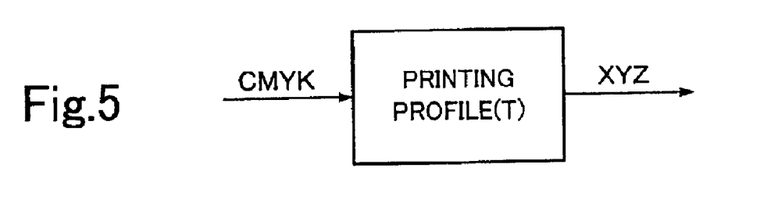
FIG. 5 is a conceptual view of a printing profile.

FIG. 5 is a conceptual view of a printing profile.

The printing profile receives image data defined by CMYK (an example of a target device color space referred to in the present invention), and converts the image data of CMYK into image data defined by XYZ values (an example of a colorimetric color space referred to in the present invention).

Next, there will be described a method of creating the printer profile.

Incidentally, here, it is assumed that the printer profile is already created by a maker of the printer and is delivered together with the printer. Accordingly, while there is no need to newly create the printer profile, hereinafter, there will be described a basic creating method wherein the printer profile is newly created.

A method of creating the printer profile is the same as the method of creating the printing profile excepting the point that an output device for outputting a color chart is a printer but not a printing machine. That is, the personal computer 50 shown in FIG. 1 sequentially changes dot % data for four colors of CMYK as 0%, 10%, . . . , 100% for each color, and transmits the dot % data thus generated to the printer 60. The printer 60 outputs the color chart in accordance with the dot % data. While the image 61 shown in FIG. 1 is not an image representative of a color chart, the spectrocolorimeter 70 is used to measure color patches constituting a color chart, assuming that the same type of color chart as the color chart created by printing of the printing machine 40 for creating the printing profile is outputted instead of the image 61. Thus, it is possible to construct a printer profile representative of the association between coordinate values on the color space (an example of a proofer color space referred to in the present invention) for four colors of CMYK and coordinate values on the colorimetric color space (XYZ space).

Figure 6:
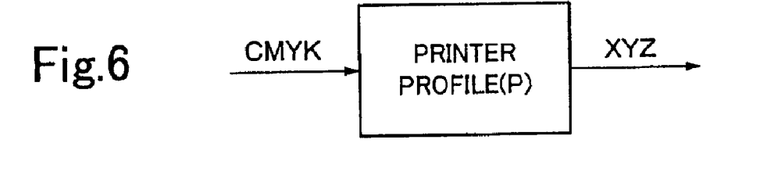
FIG. 6 is a conceptual view of a printer profile.

FIG. 6 is a conceptual view of a printer profile.

The printer profile receives dot % data for four colors of CMYK and converts the dot % data for CMYK into colorimetry data of XYZ. Here, P denotes a printer profile (a rectification printer profile) for converting the dot % data for CMYK into the colorimetry data of XYZ. $P^{-1}$ denotes a printer profile for converting the colorimetry data of XYZ into the dot % data for CMYK.

While it has been explained that the printer 60 outputs an image in accordance with the dot % data for four colors of CMYK, it is acceptable that a printer, which outputs an image in accordance with data for RGB for example, is used to create a printer profile suitable for the printer in such a manner that the personal computer 50 generates data defined by the RGB space to output a color chart.

However, here, there is explained a case where the printer 60, which outputs an image in accordance with the dot % data for four colors of CMYK, is used.

Figure 7:
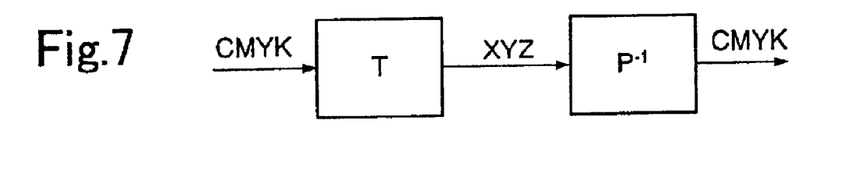
FIG. 7 is a view of a combination profile in which a print profile and a printer profile are combined.

FIG. 7 is a view of a combination profile in which a printing profile and a printer profile are combined.

A printing profile T is used to convert the dot % data for CMYK for printing into colorimetric data of XYZ. Next, the inversion printer profile $P_{-1}$ is used to convert the colorimetry data of XYZ into the dot % data for CMYK for a printer. Thus, it is possible that the printer 60 outputs a proof image, which is the same as printing in color, in accordance with the dot % data for CMYK for printing thus generated. The combination profile, which comprises the printing profile T and the inversion printer profile $P^{-1}$, is a color conversion definition for converting a CMYK color space for printing into a CMYK color space for a printer.

The color conversion definition, as mentioned above, is created by the personal computer 80 constituting the print and proof image creating system shown in FIG. 1, and then is installed in the personal computer 50 constituting the print and proof image creating system shown in FIG. 1. Image data described in PDL, which is fed from the workstation 20, is converted into image data for CMYK, and then the image data for CMYK is converted into image data for CMYK for a printer using the color conversion definition, so that the printer 60 is used to output an image in accordance with the image data for CMYK for a printer, and thereby creating a proof image for an image of printing.

It is not always necessary that the personal computer 80 shown in FIG. 1 creates up to the combination file. It is acceptable that the personal computer 80 creates the printing profile or the printer profile, and the printing profile or the printer profile thus created is fed to the personal computer 50 to create the combination profile.

Even if the color conversion definition is created in the manner as mentioned above, and the color conversion definition is used to convert image data for printing entered from the workstation into image data for a printer so that a proof image is created in accordance with the image data for a printer, it happens that a color of the proof image is not completely coincident with a color of an image of a printer matter that is created in accordance with the image data for printing, and there is a discrepancy therebetween. As one of the causes, it is considered that while it is explained that the printer profile is already created at a maker side of the printer basically in accordance with the procedure as mentioned above, the printer profile created at the maker side is not a printer delivered per se and is one created using a reference printer determined at the maker side, and thus there is a certain degree of discrepancy between the reference printer and the delivered printer.

However, it is considered that the cause of a discrepancy in color between the proof images resides in not only the discrepancy between the reference printer and the delivered printer, as mentioned above, but also a gathering of various types of error main cause in a process of creation of a printing profile and other various types of main cause.

In view of the above, next, there will be described a method of correcting color reproduction characteristic in which a degree of coincidence in color of proof images is insufficient and a further accuracy is improved in coincidence of color.

Figure 8:
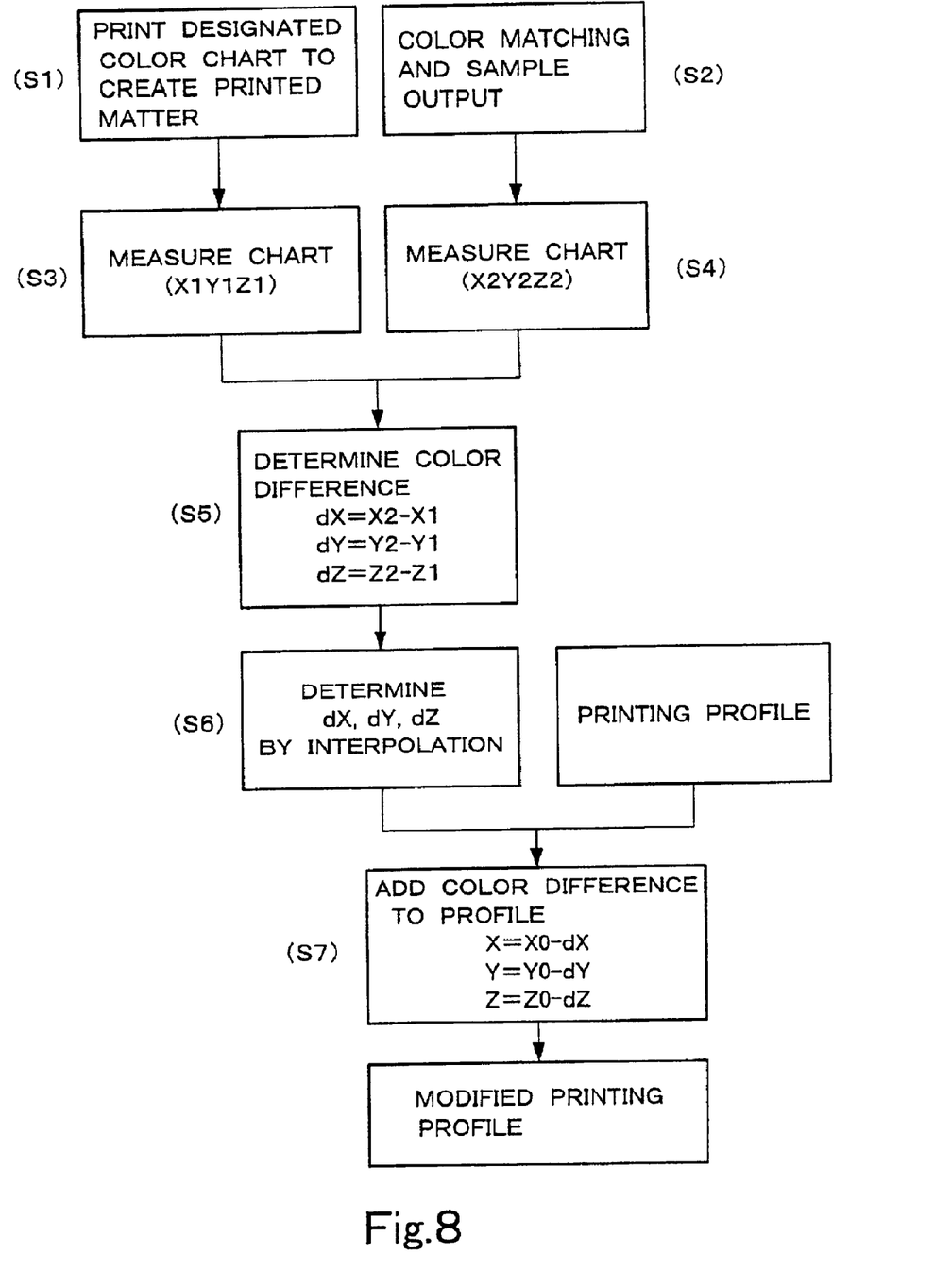
FIG. 8 is a flowchart useful for understanding an embodiment of a color reproduction characteristic correction method of the present invention.
Figure 9:
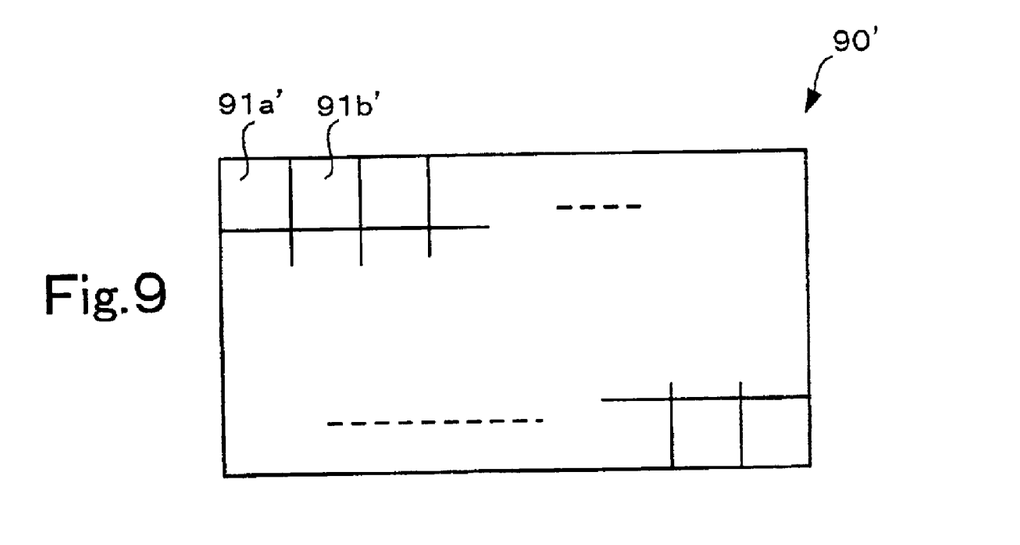
FIG. 9 is a view showing an example of a color chart.

FIG. 8 is a flowchart useful for understanding an embodiment of a color reproduction characteristic correction method of the present invention. FIG. 9 is a view showing an example of a color chart. First, the color chart of FIG. 9 will be explained.

A color chart 90' shown in FIG. 9 is created, similar to the color chart 90 used in creation of the printing profile, as shown in FIG. 4, in accordance with dot % data of a combination (lattice point) of dot % in units of 10% on a CMYK color space, but is created in accordance with dot % data of a combination (lattice point), which is different from the combination (lattice point) of dot % used in the color chart 90 adopted in creation of the printing profile, as shown in FIG. 4, of the lattice points in units of 10% on the CMYK color space. With respect to important colors such as skin color, sky color and gray, it is preferable to adopt color chart data in which density of the point of measurement selected from among the lattice points in units of 10% on a CMYK color space becomes high. Here, data for creating the color chart 90' shown in FIG. 9, as mentioned above, is referred to as correcting chart data.

In the manner as mentioned above, the use of the color chart 90' of dot % of the point different from the lattice point of dot % that is concerned with the first creation of the printing profile makes it possible to expect the same effect as a case where a profile is created in accordance with color patches associated with more points on the CMYK color space so as to meet the first creation of the printing profile, and thereby constructing the profile with greater accuracy.

The color chart 90', which is created in accordance with the correcting chart data, is less in the number of color patches constituting the color chart as compared with the color chart 90 (cf. FIG. 4) wherein the printing profile is created. The color chart 90' is used for correction of the profile created once. Thus, there is no need to prepare the color patches by the same number as that of first creation of the printing profile, and reduction of the number of color patches makes it possible to reduce an amount of working for the correction and an amount of arithmetic operation for the correction.

When the correcting chart data for printing, which is representative of the color chart 90', is converted into correcting chart data for a printer using a color conversion definition as an object of the correction, the correcting chart data for a printer is constituted of data in the color reproduction area of the printer 60 (cf. FIG. 1).

In the event that the correcting chart data for a printer includes data out of the color reproduction area of the printer 60, processing of a boundary of the color reproduction area would be a hard job and in some cases there is a possibility that instead of performing the correction, an error occurs. On the other hand, a provision of adoption of the correcting chart data in the color reproduction area of the printer 60, as mentioned above, makes it possible to implement the correction of great accuracy with less amount of arithmetic operation.

Next, there will be explained the flowchart of FIG. 8.

First, the printing machine 40 is used to print the color chart 90' (cf. FIG. 9) designated by the correcting chart data for printing so as to create a printed matter on which the color chart 90' is printed (at step S1). Next, as explained referring to FIG. 2, there are measured XYZ values (X1, Y1, Z1) for each of the plurality of color patches 91a, 91b, . . . constituting the color chart 90 (at step S3). This result of measurement is fed to the personal computer 80.

Further, the correcting chart data for printing is converted into the correcting chart data for printer in accordance with the color conversion definition as an object of the correction, and the printer 60 is used to output the color chart, which is designated by the correcting chart data for printer (at step S2). Next, XYZ values (X2, Y2, Z2) on each color patch are measured in a similar fashion to that of the color patches obtained by the printing machine 40 (at step S4). The XYZ values (X2, Y2, Z2) are also fed to the personal computer 80.

When the personal computer 80 receives measurement data (X1, Y1, Z1) and (X2, Y2, Z2) of XYZ, which are related to the color chart obtained by the printing machine and the color chart obtained by the printer, respectively, the personal computer 80 performs the following arithmetic operation processing.

First, a difference between both the measurement data is determined, so that a color difference therebetween is determined (at step S5).

$$dX=X2-X1$$

$$dY=Y2-Y1$$

$$dZ=Z2-Z1 \tag{1}$$

where (X1, Y1, Z1) and (X2, Y2, Z2) typically show colorimetric data of each color patch of the respective color chart, and the arithmetic operation of the formula (1) is performed for each pair on associated color patches between the color chart obtained by the printing machine and the color chart obtained by the printer.

Next, in accordance with an interpolation calculation based on a result of the arithmetic operation of the formula (1), there are determined color differences dX, dY and dZ of the respective points in the colorimetric color space corresponding to 0%, 10%, 20%, . . . , 100% in dot %, of the CMYK color space for printing (at step S6).

Next, as mentioned above, the printing profile, which is already created, is referred to. The printing profile shows an association between coordinate values (CMYK values) of the respective lattice points of 0%, 10%, 20%, . . . , 100% in dot % on each color of CMYK, on the CMYK color space and coordinate values (XYZ values) of the XYZ color space. Here, with respect to the respective lattice points of the CMYK color space, the color differences (dX, dY, dZ)

associated with the respective lattice points, which are determined in the step S6, are added (at step S7).

$$X = X0 + dX$$
$$Y = Y0 + dY$$
$$Z = Z0 + dZ \qquad (2)$$

Where the values (X0, Y0, Z0) are representative of coordinate values of the XYZ color space, associated with the lattice points of the CMYK color space, of the printing profile before the correction.

With respect to the lattice points, when an arithmetic operation of the formula (2) is carried out, the printing profile is modified, so that a modified printing profile is created.

According to this correction method, it is possible to perform the correction with great accuracy by mechanically advancing the work.

Instead of the printing file before modification, the modified printing profile thus created is adopted and there is adopted a color conversion definition in which the modified printing profile and the printer profile used already when the correction is performed are combined, so that a color matching is performed. This feature makes it possible to obtain a proof image, which is coincident in color with greater accuracy as compared with the correction before.

Incidentally, according to the present embodiment as mentioned above, of the printer profile and the printing profile, only the printing profile is modified. The reason why this is to do so is that when it is intended that the printer profile is modified, since this modification may include a modification relating to the error main factor at the printing machine, in the event that it is intended that the same printer is used also as a proofer of another printing machine (or other printing conditions of the same printing machine), when the printing profile of the another printing machine (or other printing conditions of the same printing machine) is combined with the modified printer profile, the combined profile may include additionally the error of the printing machine that is used when the printing profile is modified on an earlier occasion. On the other hand, when the printer is used as a proofer associated with only a certain printing condition of a certain printing machine, it is acceptable that the printer profile is modified instead of the modification of the printing profile.

Alternatively, according to the present invention, without modifying any of the printing profile and the printer profile, it is acceptable that the correcting conversion definition corresponding to the arithmetic operation shown in FIG. (2), that is, the correcting conversion definition for converting (X0, Y0, Z0) into (X=X0+dX, Y=Y0+dY, Z=Z0+dZ) is created in the XYZ color space, and when the color matching is performed, a color conversion definition, in which the printing profile, the correcting conversion definition and the printer profile are combined, is adopted.

It is noted that the above-mentioned any aspects are included in the aspect of "correcting the color conversion definition" referred to in the present invention.

As mentioned above, according to the present invention, it is possible to readily correct the color reproduction characteristic of a proof image with great accuracy.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A color reproduction characteristic correction method of correcting a color reproduction characteristic of a proof image wherein a color conversion definition, which consists of a combination of a target profile of a target device for outputting an image based on target image data defined by coordinate values on a predetermined target device color space, said target profile being representative of an association between the coordinate values on the target device color space and coordinate values on a colorimetric color space of a device-independence, and a proofer profile of a proofer for outputting an image based on proof image data defined by coordinate values on a predetermined proofer color space, said proofer profile being representative of an association between coordinate values on the proofer color space and coordinate values on the colorimetric color space of the device-independence, is used to convert the target image data defined by the coordinate values on the target device color space into the proof image data defined by the coordinate values on the proofer color space so that the proof image based on the proof image data is outputted using said proofer, wherein said target profile is created via a first chart output step in which said target device is used to output a color chart in accordance with first chart data representative of a color chart in which a plurality of color patches are arranged, said first chart data being defined by the coordinate values on the target device color space, and a first color measurement step of measuring the plurality of color patches constituting the color chart obtained in said first chart output step to obtain first color measurement data defined by the colorimetric color space, and wherein said color reproduction characteristic correction method comprises:

a second chart output step in which said target device is used to output a color chart in accordance with second chart data representative of a color chart in which a plurality of color patches is arranged, at least part of the plurality of color patches including a color patch defined by coordinate values different from coordinate values for the plurality of color patches constituting the color chart represented by the first chart data on said target device color space;

a second chart color measurement step for measuring a plurality of color patches constituting the color chart obtained in said second chart output step to obtain second color measurement data defined by the colorimetric color space;

a third chart output step in which said color conversion definition is used to convert said second chart data defined by the coordinate values on said target device color space into third chart data defined by the coordinate values on said proofer color space, and said proofer is used to output a color chart in accordance with the third chart data;

a third chart color measurement step for measuring a plurality of color patches constituting the color chart obtained in said third chart output step to obtain third color measurement data defined by the colorimetric color space; and a definition correction step of correcting said color conversion definition in accordance with the second color measurement data in said second chart color measurement step and the third color measurement data in said third chart color measurement step.

2. A color reproduction characteristic correction method according to claim 1, wherein said second chart output step and said third chart output step output the color charts in accordance with the second chart data and the third chart data each representative of a color chart in which color patches, number of which is less than that of the color patches constituting the color chart represented by the first chart data, are arranged, respectively.

3. A color reproduction characteristic correction method according to claim 1, wherein said second chart output step outputs the color chart in accordance with the second chart data which is converted into the third chart data representative of a color chart wherein when the second chart data is converted into the third chart data, all a plurality of color patches constituting the color charts represented by the third chart data is composed of color patches in a color reproduction area reproduced by said proofer.

4. A color reproduction characteristic correction method according to claim 1, wherein said definition correction step is a step in which difference color measurement data representative of a difference between the second color measurement data and the third color measurement data is determined, and said color conversion definition is corrected in accordance with the difference color measurement data.

5. A color reproduction characteristic correction method according to claim 1, wherein said definition correction step is a step in which of the target profile and the proofer profile constituting the color conversion definition, the target profile is corrected.

* * * * *